(12) United States Patent
Dalessandro et al.

(10) Patent No.: US 9,053,436 B2
(45) Date of Patent: Jun. 9, 2015

(54) METHODS AND SYSTEM FOR PROVIDING SIMULTANEOUS MULTI-TASK ENSEMBLE LEARNING

(71) Applicant: Dstillery, Inc., New York, NY (US)

(72) Inventors: Brian Dalessandro, Brooklyn, NY (US); Rodney Hook, New York, NY (US); Yuva Manhendran, Hackensack, NY (US)

(73) Assignee: Dstillery, Inc., New York, NY (US)

( * ) Notice: Subject to any disclaimer, the term of this patent is extended or adjusted under 35 U.S.C. 154(b) by 0 days.

(21) Appl. No.: 14/209,453

(22) Filed: Mar. 13, 2014

(65) Prior Publication Data

US 2014/0279753 A1    Sep. 18, 2014

Related U.S. Application Data

(60) Provisional application No. 61/780,280, filed on Mar. 13, 2013.

(51) Int. Cl.
*G06N 99/00* (2010.01)
*G06N 5/02* (2006.01)
(52) U.S. Cl.
CPC ............ *G06N 99/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 7,031,901 B2* | 4/2006 | Abu El Ata | 703/21 |
| 8,370,280 B1* | 2/2013 | Lin et al. | 706/12 |
| 2011/0197276 A1* | 8/2011 | Dorrendorf et al. | 726/22 |
| 2011/0246406 A1* | 10/2011 | Lahav et al. | 706/46 |
| 2012/0130805 A1* | 5/2012 | On et al. | 705/14.49 |
| 2013/0103624 A1* | 4/2013 | Thieberger | 706/12 |

* cited by examiner

*Primary Examiner* — Kakali Chaki
*Assistant Examiner* — Mai T Tran
(74) *Attorney, Agent, or Firm* — Cooley LLP

(57) ABSTRACT

A complete end-to-end modeling system is provided that includes data sampling, feature engineering, action labeling, and model learning or learning from models built based on collected data. The end-to-end modeling process is performed via an automatic mechanism with minimal or reduced human intervention. A processor-readable medium is disclosed, storing processor-executable instructions to instantiate an automated data sampling and prediction structure training component, the automated data sampling and prediction structure training component being configured to automatically collect user event data samples, and use the collected user event data samples to train multiple prediction structures in parallel.

26 Claims, 6 Drawing Sheets

METHODS AND SYSTEM FOR PROVIDING SIMULTANEOUS MULTI-TASK ENSEMBLE LEARNING

PRIORITY CLAIM

This application is a non-provisional of and claims priority under 35 U.S.C. §119 to U.S. provisional application Ser. No. 61/780,280, filed Mar. 13, 2013, titled "Methods and System for Providing Simultaneous Multi-Task Ensemble Learning," which is herein expressly incorporated by reference.

BACKGROUND

Some embodiments described herein relate generally to providing an automated system for simultaneous multi-task ensemble learning.

In recent years, vast volumes of empirical data have become available through the widespread use of electronic devices. Artificial intelligence provides methods for discovering logical relations and patterns of behavior within the data and for learning from data. The discovered patterns in data and analysis results provided via various scientific disciplines such as, for example, machine learning provide insights for service providers, managers, manufacturers, business owners and the like to plan proper business strategies and prepare for future trends by predicting events by building prediction models based on the results of data analysis.

The extremely high volume of available data, however, makes the data analysis difficult, expensive, and time consuming. Various techniques are, therefore, adopted to reduce the amount of time and expense spent on data analysis. Data sampling is one such technique, which is concerned with selection of a subset of data from within a statistical population to estimate characteristics of the whole population. In addition to sampling, forecasting and prediction of future events based on the data derived from similar events in the past, includes various processes such as, for example, feature engineering (identifying an appropriate mapping from unstructured to structure data such that the structured data may be used for the purpose of modeling correlated relationships within the data), action labeling (systematic identification of relevant events that become dependent variables in future modeling processes), etc.

In statistics and machine learning, ensemble methods are analysis techniques that use a set of models to obtain better predictive performance for a task than could be obtained from any of the constituent models.

Currently known machine learning techniques, however, require user intervention and lack the capability of automated and simultaneous application of the entire workflow for machine learning methods on data. Therefore, a need exists for systems and methods for automated and simultaneous application of machine learning techniques such as, for example, data sampling, feature engineering, action labeling, etc. on sampled and extracted data for various tasks.

SUMMARY

In some embodiments, a complete end-to-end modeling system is provided that includes data sampling, feature engineering, action labeling, and model learning or learning from models built based on collected data. The end-to-end modeling process is performed via an automatic mechanism with minimal or reduced human intervention. The end-to-end system may process a set of input data variables and supply the set of input data variables to multiple model builders to build and update learning models in parallel.

In one embodiment, a processor-readable storage medium is disclosed, storing processor-executable instructions executable by a processor to: instantiate an automated data sampling and prediction structure training component, the automated data sampling and prediction structure training component being configured to automatically collect user event data samples, and use the collected user event data samples to train multiple prediction structures in parallel; receive, via the automated data sampling and prediction structure training component, user event data samples indicative of a user activity performance characteristic; identify user event data associated with one or more target attributes from the user event data samples; convert the user event data into a set of independent variables in compliance with a data format; build a prediction structure (1) having the set of independent variables as inputs and (2) that generates a prediction objective output during execution of the prediction structure; determine a prediction variable parameter for the prediction structure by instantiating the prediction structure; and execute, by the automated data sampling and prediction structure training component, the prediction structure associated with the prediction variable parameter to produce the prediction objective value.

In one embodiment, a processor-readable storage medium is disclosed, storing processor-executable instructions executable by a processor to: instantiate an automated data sampling and prediction structure training component, the automated data sampling and prediction structure training component being configured to automatically collect user event data samples, and use the collected user event data samples to train multiple prediction structures in parallel; receive, via the automated data sampling and prediction structure training component, user event data samples indicative of a user activity performance characteristic; identify user event data associated with one or more target attributes from the user event data samples; convert the user event data into a set of independent variables in compliance with a data format; retrieve a prediction structure that employs the set of independent variables as inputs and that generates a prediction objective output when the prediction structure is executed; validate the prediction structure with the set of independent variables when a validation metric triggers validation; and deploy, without exogenous interruption, the prediction structure upon validation.

In one embodiment, a processor-readable storage medium is disclosed, storing processor-executable instructions executable by a processor to: instantiate an automated data sampling and prediction structure training component, the automated data sampling and prediction structure training component being configured to automatically collect user event data samples, and use the collected user event data samples to train multiple prediction structures in parallel; retrieve a prediction structure (1) having a vector of variables as inputs and (2) that generates a prediction objective output during execution of the prediction structure; receive, via the automated data sampling and prediction structure training component, user event data samples related to the vector of variables; identify user event data associated with one or more target attributes from the user event data samples; convert the user event data into a set of independent variables in compliance with a format of the vector of variables; execute the prediction structure based on the set of independent variables to produce the prediction objective value; storing the prediction objective value with the user event data to produce updated user event data; incrementally update the prediction structure with the updated user event data and the prediction objective value to produce an updated prediction structure; and deploy, by the automated data sampling and prediction structure training component, the updated prediction structure upon incrementally updating.

In one embodiment, the processor-executable instructions are further executable by the processor to: build a first prediction structure and a second prediction structure in parallel, the first structure (1) having the set of independent variables as inputs and (2) that generate a first prediction objective output during execution of the first prediction structure, the second structure (1) having the set of independent variables as inputs and (2) that generate a second prediction objective output during execution of the second prediction structure determine a first prediction variable parameter for the first prediction structure by instantiating the first prediction structure and a second prediction variable parameter for the second prediction structure by instantiating the second prediction structure; and execute, by the automated data sampling and prediction structure training component, the first prediction structure associated with the first prediction variable parameter to produce a first prediction objective value and the second prediction structure associated with the second prediction variable parameter to produce a second prediction objective value.

DETAILED DESCRIPTION

Figure 1:
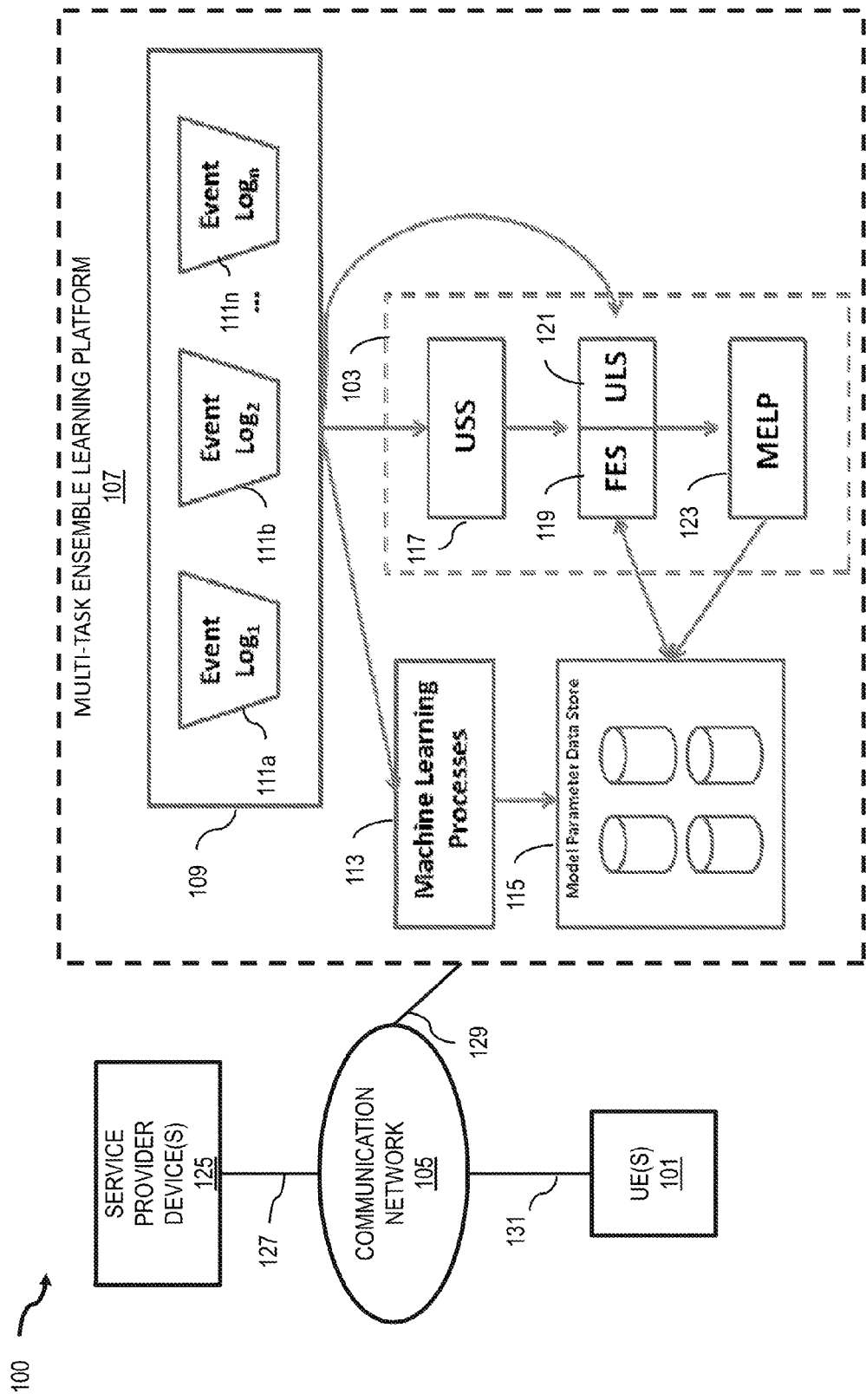
FIG. 1 is a schematic block diagram of a multi-task ensemble learning environment, according to an embodiment.

In some embodiments, an automated system (e.g., an automated data sampling and prediction structure training component) is provided for simultaneous multi-task ensemble learning, which uses multiple models (e.g., prediction models, also referred to herein as prediction structures) to obtain better predictive performance for a task than could be obtained from any of the constituent models. Each task can be associated with a business objective and generally involves building prediction models for events directly related to the business at hand. The automated system may include various processes applied on each task such as, for example, data sampling, feature engineering, data labeling, ensemble learning, etc., and the automated system may receive input data samples for automated execution of the various processes in an uninterrupted manner, e.g., without any exogenous or intermediary human controls or commands. For example, a task may include analyzing user browsing activities of a specific advertisement, user click-through activities with a specific advertisement, user purchase transaction activities relating an advertised product, and/or the like.

Such a system can be an end-to-end system having components and resources to perform the process without involving components or resources outside of the end-to-end system. For example, a complete end-to-end modeling system can provide components of a modeling process such as data sampling, feature engineering, data labeling and model learning. The end-to-end modeling system can be provided via an automatic mechanism with minimal, reduced or no human intervention, where at least some of the components are automated. Furthermore, the end-to-end modeling system can perform multiple learning and modeling tasks simultaneously.

Such a system may include an automated system that performs model building pipeline that functions either as a batch or a streaming process, which includes: a data sampling and scrubbing process, a feature engineering process, a model building/training process, a model deployment process. In some instances, in batch mode, the data sampling process may pull data from a traditional data storage system and then proceed with the later steps in the process. Alternatively, in streaming mode, the process may sample events as they enter into the system.

In some instances, separate learning tasks can be configured individually to accommodate task specific objectives. User sampling can be performed automatically such that task specific performance criteria can be met. Furthermore, user sampling can be configurable such that it can pull data from various event streams.

In some instances, feature engineering can be configured to task specific goals. Feature engineering can also accommodate various levels of feature complexity or perform model scoring from models derived outside of the system such that output of models derived from outside of the system can be used as a feature.

In some instances, user labeling can be configured to meet task specific objectives. User labeling can pull data from any arbitrary event stream. Furthermore, user labeling can account for multiple types of outcomes within a single task and can be performed such that it pulls outcomes from post sampling events.

In some instances, model learning can be configured to seamlessly read input data from feature engineering and user labeling processes. Model selection can be performed based on task specific rules and task specific optimization. Furthermore, feature selection can be performed, either implicitly based on the type of modeling algorithm selected or explicitly via a pre-defined feature selection methodology. In some instances, the end-to-end modeling system can enable a scheme for proxy learning or estimates and port model parameters.

As used herein, the singular forms "a," "an" and "the" include plural referents unless the context clearly dictates otherwise. Thus, for example, the term "a "task" is intended to mean a single task or a combination of tasks (e.g., tasks associated with a process, business, etc.)

FIG. 1 is a schematic block diagram of a multi-task ensemble learning environment, according to an embodiment. The computer network system 100 includes at least one User Equipment (UE) 101, and at least one service provider device 125 that can be operatively coupled to one or more UEs 101 or other application providers via a communication network 105. The computer network system 100 also includes a multi-task ensemble learning platform 107, which can be operatively coupled to one or more UEs 101 or to one or more service provider device(s) 125 via the communication network 105. Any of the devices or platforms of the computer network system 100 can be equipped with local memory/storage spaces such as data store 115 or the repository 109 (not shown for UEs 101 or service provider device 125 in FIG. 1). Furthermore, the devices and platforms of the system 100 may have access to centralized or distributed memory/storage spaces (not shown in FIG. 1) through the communication network 105. Thus, FIG. 1 is merely an example illustrating the types of devices and platforms that can be included within a computer network system 100.

Communication network 105 can be any communication network, such as the Internet, configurable to allow the UEs 101, multi-task ensemble learning platform 107, and the service provider device(s) 125 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; the service provider device(s) 125, and/or the multi-task ensemble learning platform 107 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the UEs 101 are operatively coupled to communication network 105 via network connection(s) 131; service provider device(s) 125 are operatively coupled to communication network 105 via network connection(s) 127; and the multi-task ensemble learning platform 107 is operatively coupled to communication network 105 via network connection(s) 129. Network connections 127, 129, and 131 can be any appropriate network connection for operatively coupling UEs 101, service provider device(s) 125, and the multi-task ensemble learning platform 107.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one UEs 101, more than one multi-task ensemble learning platforms 107, and more than one service provider device(s) 125. A UE 101, a multi-task ensemble learning platform 107, and/or a service provider device 125, can be operatively coupled to the communication network 105 by heterogeneous network connections. For example, a first UE 101 can be operatively coupled to the communication network 105 by a WWAN network connection, another UE 101 can be operatively coupled to the communication network 105 by a DSL network connection, and a multi-task ensemble learning platform 107 can be operatively coupled to the communication network 105 by a fiber-optic network connection.

A service provider device 125 can be, for example, a web server configured to provide various applications to electronic devices, such as UE 101. The service provider device 125 can provide a service such as providing advertisements within a browser at UE 101. The UE 101, for example, can be in communication with the service provider device 125 via the communication network 105 under the supervision of the multi-task ensemble learning platform 107. Furthermore, a service provider device 125 can include one or more processors, performing processes associated with the services provided to the UEs 101; service provider device 125 can also include one or more memories, storing data and process results (each not shown) and storing code for execution by the one or more processors and representing the functions performed by the one or more processors.

The UEs 101 can be any of a variety of electronic devices that can be operatively coupled to communication network 105. A UE 101 can be a personal computer, a tablet computer, a personal digital assistant (PDA), a cellular telephone, a portable/mobile internet device and/or some other electronic communication device. The UE 101 can include a web browser configured to access a webpage or website hosted on or accessible via the service provider devices(s) 125 (e.g., advertisement providers) over communication network 105. The UE 101 can be configured to support, for example, HTML using JavaScript. For example, the UE 101 can include a web browser, such as, Firefox, Safari, Dolphin, Opera and Chrome. An Internet page or website can be accessed by a user of a web browser at a UE 101 by providing the web browser with a reference such as a uniform resource locator (URL), for example, of a webpage. For example, a user of a UE 101 can access a service provider device 125 via a URL designated for the service provider device 125. In some instances, UE 101 can include specialized software for accessing a web server other than a browser, such as, for example, a specialized network-enabled application or program. In some instances, portions of a website accessible via a web server can be located in a local or remote memory space/data store accessible to the web server. A data store can be at least one of a database, a data warehouse, or a file, stored in a memory (not shown). A UE 101 can also include a display, monitor or user interface (not shown), a keyboard, various ports (e.g., a USB port), and other user interface features, such as, for example, touch screen controls, audio components, and/or video components (each not shown) implemented in hardware and/or software (stored in memory and/or executed on a processor). A UE 101 can be operatively coupled to communication network 105 via the user interface and network connection 131.

The multi-task ensemble learning platform 107 can include a simultaneous multi-task ensemble learning system 103, a repository 109 of events logs 111a-111n that are automatically defined and maintained by a server such as a service provider device 125 of activities performed by users of UEs 101 within the multi-task ensemble learning platform 107, a machine learning platform 113, and a data store (memory) 115. Furthermore, the multi-task ensemble learning platform 107 can include one or more processors, performing processes associated with the multi-task ensemble learning, and one or more memories, storing data and process results (each not shown) and storing code for execution by the one or more processors and representing the functions performed by the one or more processors.

In some instances, the automated simultaneous multi-task ensemble learning system 103 is composed of a User Sampling Scheme module (USS) 117, a Feature Engineering Scheme module (FES) 119, a User Labeling Scheme module (ULS) 121, and a Multivariate Ensemble Learning Process module (MELP) 123. The components of the automated simultaneous multi-task ensemble learning system 103 can work sequentially for a given task. As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In one implementation, the USS 117 may instantiate a data sampling and scrubbing process to collect user raw log data for prediction model building. Exemplary raw log data may include data elements such as, but not limited to user device type, user operating system identifier, user browser type, user visit timestamp, web server address, website URL, ad type, ad format, ad size, ad brand name, user visit duration, user click-through directing link, subsequent user action (e.g., response input to an ad survey, purchase transactions, and/or the like), and/or the like.

In one implementation, the USS 117 may pull data in batches from a data storage system (for example, a Hadoop Distributed File System (HDFS), and/or the like), which stores user raw log data. In an alternative implementation, the USS 117 may sample user events in real-time, e.g., by receiving user event data (e.g., when a user clicks on a web page, clicks on an ad, etc.) as the user event data enters into the system. Within implementations, for both the batch and streaming data sampling modes, the USS 117 may deduplicate redundant user log data, maintaining data integrity and qualifying user eligibility for the prediction model training.

In some instances, the USS 117 selects samples of user data of UEs 101 based on arbitrary events streams 111a-111n (for example, including user activity data such as click-through, viewing, interactive actions, redirecting to a link, etc.) with the goal of representing some target population of the users. The events in events logs 111a-111n, used for user data sampling, can be events associated with the use of services provided by the service provider device(s) 125 by the users of UEs 101.

In some instances, the FES 119 extracts from the data in event logs 111a-111n relevant sets of pre-defined features that become independent variables in some machine learning algorithms associated with the machine learning platform 113. The pre-defined features can be defined by the service provider device(s) 125. The FES 119 may instantiate a feature engineering process, which is performed by a set of machines that implement 'feature-mappers.' Each feature mapper contains a set of instructions that informs the system on how to convert raw log data into a set of covariates that are eligible to be used in modeling. For example, a raw log data entry describing user action type (e.g., user click, user redirecting, user manual input, user purchase transaction, etc.) may be converted to a numeric value, denoting its different action types, and/or the like. Each user data sample may have multiple feature-mappers applied to it, and each set of feature mapper instructions associated with a feature mapper can be used in individual training applications or in conjunction within a single training application In some instances, the ULS 121 determines whether user's data of UEs 101 sampled by the USS 117 performed specific actions within one or more pre-defined time frames. In some instances, the MELP 123 uses machine-learning-based methods provided by the machine learning platform 113 to build prediction models using the information extracted by the FES 119 to predict the actions from ULS 121. The machine learning platform 113 can store the built prediction models in the data store 115. In various instances, sampled user data by the USS 117, sets of pre-defined features extracted by the FES 119, results from data analysis by the ULS 121, and prediction models provided by the MELP 123 are stored in the data store 115.

Figure 2:
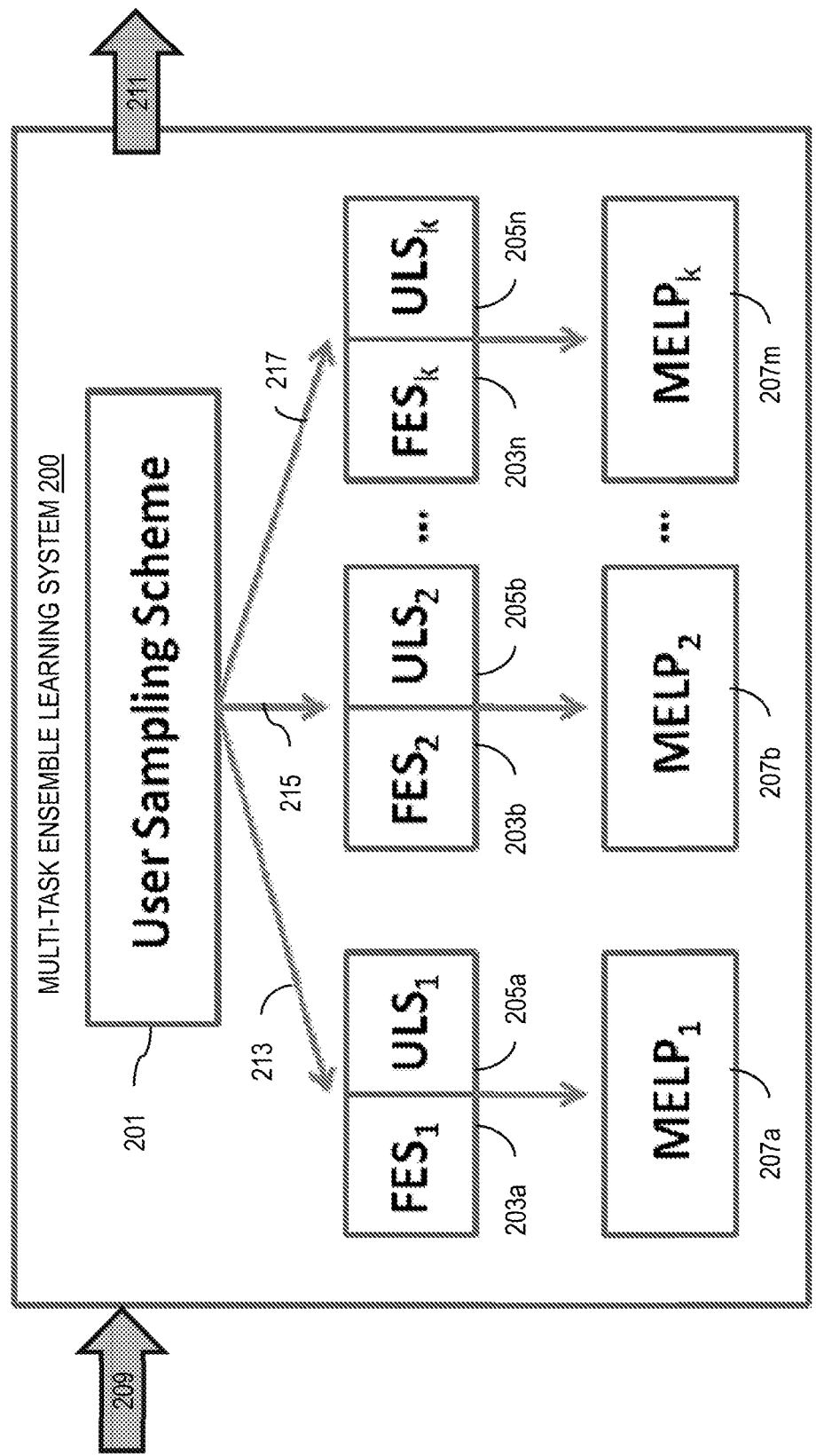
FIG. 2 is a schematic block diagram of an automated simultaneous multi-task ensemble learning system, according to an embodiment.

FIG. 2 is a schematic block diagram of an automated simultaneous multi-task ensemble learning system 200, according to an embodiment. The simultaneous multi-task ensemble learning system 200 can be similar to the simultaneous multi-task ensemble learning system 103 of FIG. 1, where the USS 201 can be similar to the USS 117, the FES 203a-203n can be similar to the FES 119, the ULS 205a-205n can be similar to the ULS 121, and the MELP 207a-207m can be similar to the MELP 123. As shown in FIG. 2, a simultaneous multi-task ensemble learning system 200 can include a USS module 201, one or more FES module 203a-203n, one or more ULS module 205a-205n, and one or more MELP module 207a-207m. Furthermore, the simultaneous multi-task ensemble learning system 200 communicates with other components of a computer network system (e.g., computer network system 100 of FIG. 1) via input signal 209 and output signal 211.

In various alternatives, the simultaneous multi-task ensemble learning system 200 and its components may be located anywhere within a communication network system 100 such as that shown in FIG. 1 including, but not limited to, within the UEs 101, within the service provider device(s) 125, or in separate locations within the communication network system 100 of FIG. 1.

For example, the data sampler may filter events at run time on billions of browser and server-to-server requests. The data sampling may be built as part of a core data processing as an Extract, transform and loading (ETL) application. Training data may be pulled from a real time scoring system (e.g., which provides regression scoring to the prediction models) using feature engineering methods (e.g., see 119 in FIG. 1) that are used for training the model. In one implementation, the integration of data sampling and feature engineering increases overall efficiency by executing a large-scale task with multiple distributed core processing systems.

In some instances, the USS 201 receives events data from the event logs 111a-111n in repository 109 via an input signal 209. The USS 201 performs a sampling process to produce samples of user events data that can be used for a variety of tasks. The FES 203a-203n and ULS 205a-205n are task specific, such that features engineered by the FES 203a-203n and labels chosen by ULS 205a-205n may depend on the criteria that defines the task at hand. For example, a task can describe a user's history of interactions with a specific website (e.g., an online shopping website). In this example, a FES 203a-203n can produce a set of dependent variables that describe the interaction history; the ULS 205a-205n can produce a field that shows the number of times a browser of UE 101 has visited the website within a day of sampling the browser by the USS 201. As another example, a task can describe a user's web browser history within a specified time frame before a sampling event by the USS 201. In this example, the FES 203a-203n can produce a set of dependent variables that describe the web browser history, while the ULS 205a-205n can produce a field that indicates whether or not the same user purchased from a specific brand's website within a specified time period following the sampling event by USS 201.

In some instances, the FES 203a-203n and the ULS 205a-205n can receive data from USS 201 and execute multiple tasks simultaneously in a parallel process, as shown by arrows 213, 215, and 217, based on the data received from USS 201. Furthermore, the FES 203a-203n and the ULS 205a-205n can be configured such that their output depend on the individual task, and each instance of FES 203a-203n and ULS 205a-205n can operate simultaneously and independently from each other.

In some instances, the USS 201, the FES 203a-203n, and the ULS 205a-205n can operate together to perform a data generating process. The data generation process can include user sampling, describing features associated with the sampled user data, and labeling the sampled user data based on the described features. The MELP 207a-207m can provide a multivariate ensemble learning process.

One of the main steps in building a learning machine is having a sample of events data or user data from which to draw inferences. The events and/or user data are typically representative of samples of a group of events data and/or user data upon which the results of the learning process within a multi-task ensemble learning platform 107 can be applied. For example, the USS 201 can provide a user sampling scheme that can minimize or reduce bias between the user data sample and the users of UEs 101 who are targeted by an advertising system providing advertisements to UEs 101 via the service provider device(s) 125.

In a general context, any sample of user data of UEs 101 to which the advertisements are targeted by applications or advertisement serving strategies provided by the service provider device(s) 125, can be considered a target pool associated with target attributes. In some instances, a sampling scheme used by the USS 201 can represent the target pool as best as possible. The sampling scheme used by the USS 201 can prevent induction of distributional bias across any arbitrary set of observable features between the sample data and the target pool, for example, when distributing user's age between a target pool and a sample data. An unbiased sampling scheme can result in users of UEs 101 having the same average age and age variance as the target pool. The distributional differences between two populations can be measured by various statistical methods across one or more features.

In some instances, a target pool used by the USS 201 can be a set of browsers that are eligible to receive display advertisements in various formats and sizes using a Real Time Bidding (RTB) system. In scenarios where some type of machine-learning-based technology is deployed to refine the target pool, certain generic user characteristics are signifiers that affect potential eligibility for the refined target pool. Some examples of such characteristics are age of the user of UE 101 or the cumulative count of user events having been observed at a particular time of interest. Such user characteristics can indicate stability of the cookies in which third party information are stored about the user. In such circumstances, the target pool can be refined to the intersection of the pool users with stable cookies and the pool of users that are eligible for display advertisements via an RTB system.

In some instances, a specific implementation of sampling representative users of machine-learning-based targeting methodologies by the USS 201 within an RTB system involves conditionally selecting users during RTB events (such as advertisement requests) that meet specific cookie criteria, such as minimum/maximum age and activity levels. A further refinement of the sampling by the USS 201 can be to sample data only for users that are winners of RTB auctions at specific dollar amounts. Such a refined sampling can be achieved by bidding on pre-conditioned users within the RTB, serving random or non-branded advertisements upon winning, and logging the users that received random or non-branded advertisements.

Other sampling strategies can be used by the USS 201 refine existing sampling schemes to better represent shifting target pools, to refine existing sampling schemes to reduce newly discovered biases between the existing sample data and target pools, or to meet the needs of sampling design for future target pools. In all such cases, the user sampling by the USS 201 is generally driven by user events observed via standard practices of first or third party data collection and advertisement serving.

In some instances, the feature engineering by the FES 203a-203n is the process of mapping data from any structured and/or unstructured format and defining a vector of features (or variables) in a format such that the vector conforms to a representation that various machine learning and statistical algorithms can process.

Feature engineering by the FES 203a-203n for multivariate ensemble learning by the MELP 207a-207m can begin with unstructured user-level data collected and logged at the time of user event sampling by the USS 201. The log data provided by the USS 201 (for example, stored in data store 115) can be an input into the FES 203a-203n for feature engineering process and the FES 203a-203n can construct features via several mechanisms. The multivariate ensemble learning results provided by the MELP 207a-207m can be stored in data store 115 of FIG. 1 via an output signal 211.

In one implementation, each feature engineering module 2031-203n may convert raw user log data into a computational vector of numeric values to denote the user log data. For example, the raw user log data may comprise structured data, e.g., in the form of eXtensible Markup Language (XML), HTML, and/or the like, or unstructured data, e.g., in the form of textual description, and/or the like. An exemplary raw user data log recording a user click-through event in XML may include data fields such as user_id, user_event_timestamp, user_action_id, user_view_duration, user_redirecting_link, web_server_URL, web_ad_id, web_ad_brand, web_ad_key-_term, and/or the like.

The feature engineering module may convert the data fields into a numeric value, e.g., "0" represents a user click-through, "1" represents user click-through and staying on the page for more than 20 seconds, and/or the like.

In some instances, the feature construction by the FES 203a-203n can be based on replication of log-level data associated with UE 101 such as, for example, the number of times a website is seen by the user of UE 101. Alternatively or additionally, functional transformations of multiple fields within the log-level data associated with UE 101 such as, for example, deriving user data from the current time minus the first time the website is seen, can be used for feature construction by the FES 203a-203n. Furthermore, the FES 203a-203n can input the log-level data associated with UE 101 into a machine learning model previously derived by the FES 203a-203n and use the output score as a feature. For example, the FES 203a-203n can, input the log-level fields into a regression-based model and use the resulting regression estimate as a feature. Additionally, the FES 203a-203n can use functional transformations of features derived by multiple mechanisms such as replication of log-level data, multiple fields within the log-level data, and inputting log-level data into a previously derived model, for example by taking the logarithm or square root of a previously derived feature, or defining a binary representation of a specific level within some categorical feature.

In some instances, the ULS 205a-205n performs a user labeling scheme, which is an integral part of the multi-task ensemble learning process and performed before data is provided from the ULS 205a-205n to the MELP 207a-207m. The phrase labeling can refer to defining some type of nominal or indicator variable that represents whether or not a user of UE 101 has performed some pre-defined action within a pre-defined time period following the time of sampling, and where applicable, the magnitude of the event (e.g., in the case of a purchase, the amount purchased). For example, the ULS may optionally add a few indicator variables as part of the vector of variable inputs.

In some instances, the set of actions eligible for labeling process by the ULS 205a-205n are actions that are observable and logged within the event logs 111a-111n of FIG. 1. One of the most common types of actions that can be chosen as labels are forms of general interaction between the user and a service provider device 125 website. Examples include visits to service provider device(s) 125 home pages or purchases from service provider device(s) 125 websites. The actions can be used as labels when the multi-task ensemble learning system 200 is designed to predict the likelihood of the actions taking place under various pre-defined circumstances.

In some instances, the labeling process includes flagging specific users of UEs 101 for whom user data has been sampled via the USS 201 and observing the sampled user data within a pre-defined, post sampling time period and logging occurrences of actions of interest in repository 109. After the pre-defined, post-sampling time period has expired, the user of UE 101 is given a label by the ULS 205a-205n, indicating whether or not the action of interest occurred, and where applicable, the extent or magnitude of the action.

Figure 3:
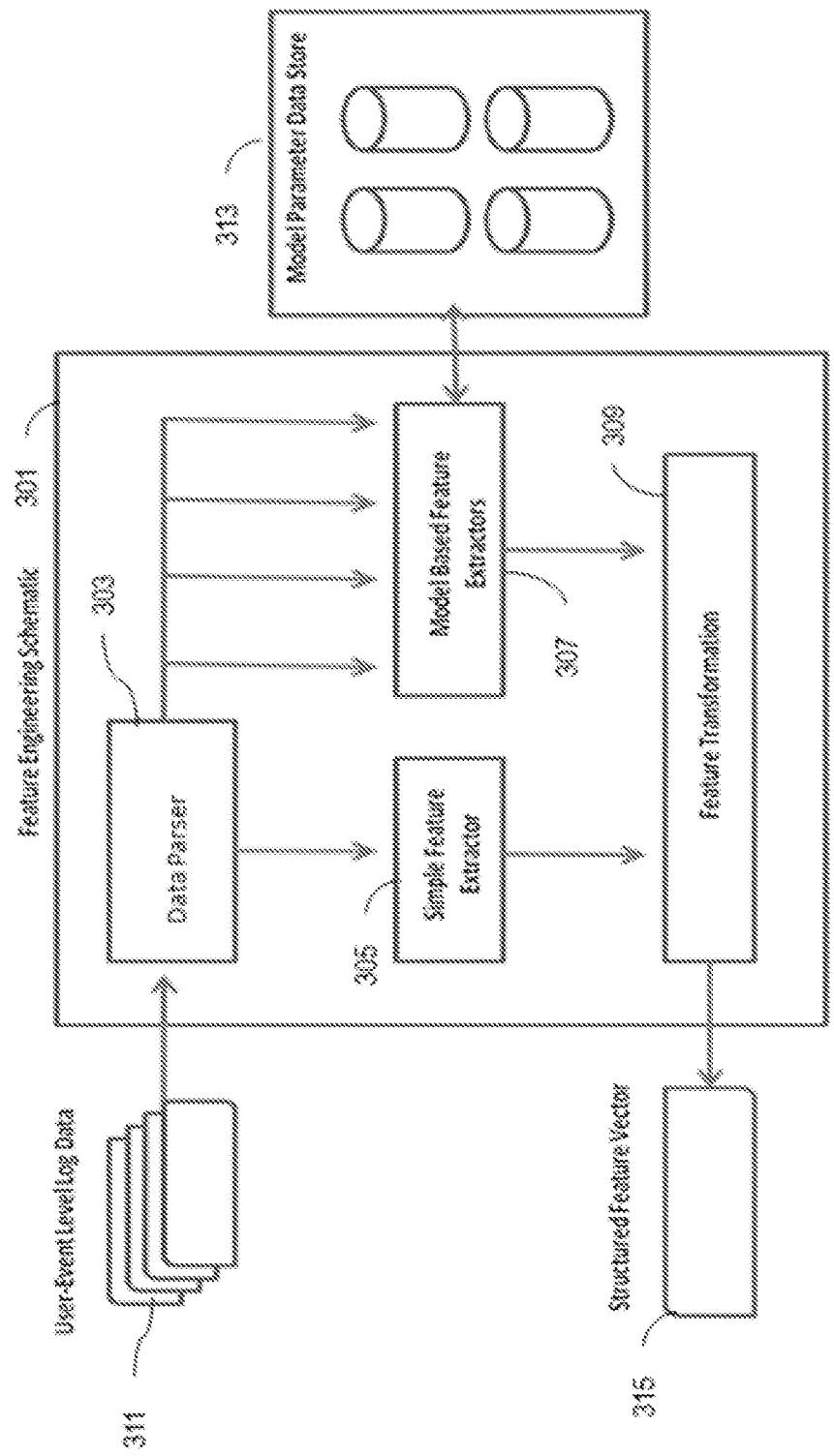
FIG. 3 is a schematic diagram of a feature engineering process, according to an embodiment.

FIG. 3 is a schematic diagram of a feature engineering process, according to an embodiment. In some instances, the feature engineering is performed by the FES 301. The FES 301 is similar to the FES 203a-203n of FIG. 2. The inputs to the FES 301 to be used for feature engineering process is the user-event level log data 311, which is the multiple data feature various format and is the product of the user sampling scheme by the USS 201 as previously discussed with respect to FIG. 2.

In some instances, a data parser 303 is designed to parse the input data 311 based on a set of pre-defined rules. Data parser 303 can parse input data 311 such as log data or cookie data. Some examples of pre-defined rules can be, (1) converting non-base 10 encoded numbers into base 10, or (2) converting complex data structures, such as arrays, tuples and dictionaries into more primitive forms.

In some instances, the simple feature extractor 305 performs a process that reads in inputs from the data parser 303 and is able to output final or near final features without referencing models or database systems outside of the FES 301. The output features from the simple feature extractor 305 can be included in the structured features vector 315, or stored in the data store 313 for further use.

In some instances, the model based feature extractor 307 maps multiple input points from the data parser 303 into a single output point using model parameters computed and stored outside of the FES 301, for example in the model parameter data store 313. The mappings performed by the model based feature extractor 307 are defined based on machine learning and statistical algorithms that get built and updated outside of the FES 301. For example, in one implementation, when the prediction model takes a form of a linear regression model, the feature extractor 307 may input the multiple input points in the format of an input vector into the linear regression model, to generate a forecasting output. Various prediction models may be adopted by the system, such as, but not limited to linear regression, logistic regression, robust regression, semiparametric regression, random forests, support vector machines, and/or the like.

In some instances, a feature transformation process 309 within the FES 301 can define pre-defined functional transformations of the input parameters without using any data or process from outside of the FES 301. The final output is a structured vector 315 of features that can be used for analysis, reporting or modeling purposes, for example by the MELP 207a-207m of FIG. 2.

Referring back to FIG. 2, in some instances, the MELP 207a-207m receives as input task-specific structured user features from the FES 203a-203n and task-specific user labels from the ULS 205a-205n. The MELP 207a-207m builds a generative model, for example using specified machine learning and statistical algorithms from data store 115. The generative model can minimize specified loss-functions between predictions of the learned model and actual observed values. Some of the machine learning and statistical algorithms that can be used, but are not limited to, are Logistic Regression, Linear Regression, Support Vector Machines, Factorization Machines, Random Forests, and the like. Furthermore, some of the types of loss-functions that can be used to produce the model, but are not limited to, are sum of squared error, log-likelihood, hinge loss, classification accuracy, and the like.

Figure 4:
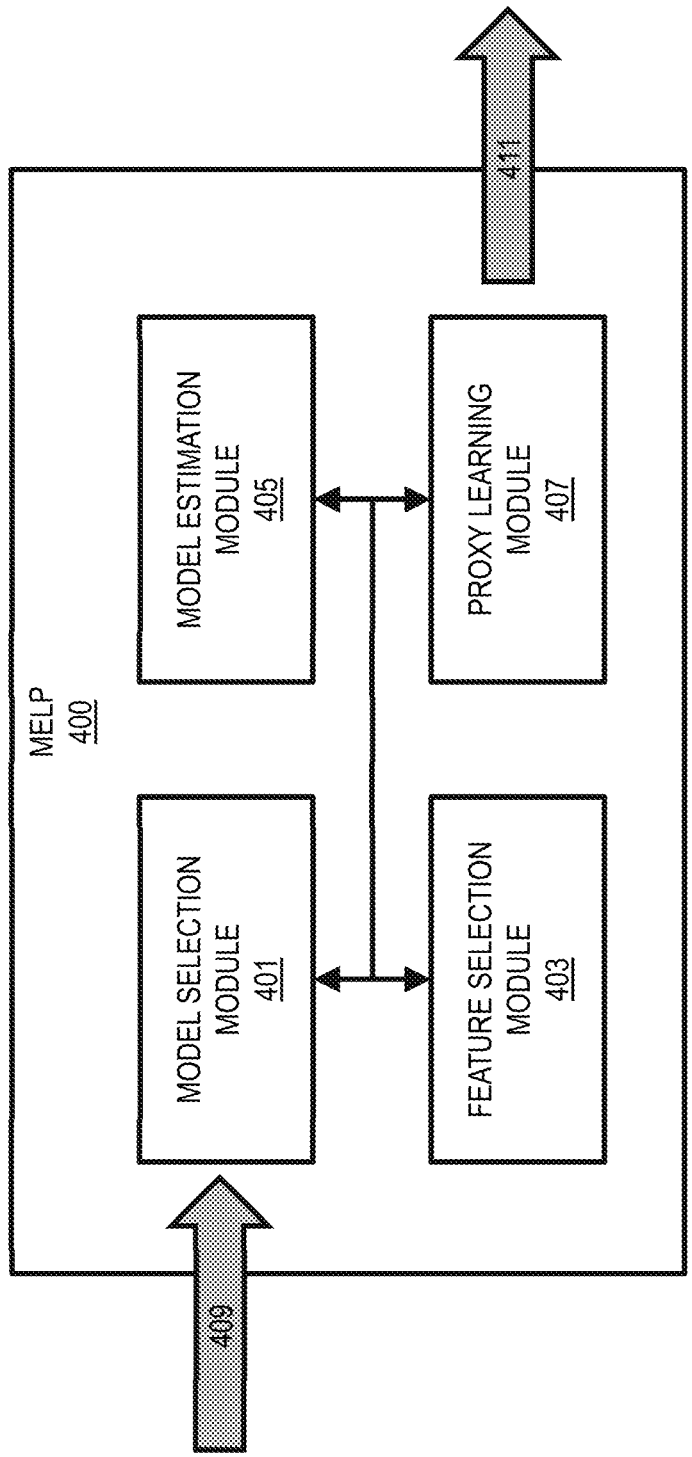
FIG. 4 is a schematic diagram of a multivariate ensemble learning process module, according to an embodiment.

FIG. 4 is a schematic diagram of a multi-task ensemble learning process module, according to an embodiment. The MELP 400 of FIG. 4 is similar to the MELP 207a-207m of FIG. 2. The MELP 400 can include components such as model selection module 401, feature selection module 403, model estimation module 405, and proxy learning module 407. The MELP 400 provides exploration of the space of possible options in order to maximize the goal of the task at hand. Each of these components can be defined and explained as they relate to the MELP 400.

In some instances, the model selection module 401 uses machine learning algorithms or statistical formulae that map a set of input received via input signal 409 to an output based on some functional form or a set of rules. In various applications, different models can be used to arrive at a desired result. For example, some applications seek to predict the probability of an event occurring, and multiple models such as logistic regression, decision trees or random forests can be used to produce a probability estimate. Model selection by the model selection module 401 is the process of choosing a specific algorithm or functional form to obtain a predicted estimate of a quantity of interest. Model selection can occur within the MELP 400 automatically based on pre-defined rules as well as based on empirical optimization of a specified objective function. Certain tasks involve different model types, such as estimation of real valued quantities warranting a linear regression, and estimation of probabilities warranting a logistic regression or decision tree. Using pre-defined rules that relate to the task at hand, the MELP 400 can select different model classes such that the output of the model matches the format of the output desired for the task. Within the set of models chosen by the pre-defined rules, further model selection occurs within MELP 400 by empirically identifying the model type that optimizes or improves the goals of the task. Such goals can be, for example, prediction accuracy and time complexity of running the model in a production scoring function.

In some instances, the feature selection module 403 provides a variable used in a specific model, and performs a feature selection process for choosing a subset of features to be used in the final version of the model, based on a given input set received via input 409. Many known mechanisms for feature selection exist, and many machine learning algorithms include feature selection as part of the underlying algorithm. Feature selection by the feature selection module 403 within MELP 400 depends on type of the model chosen. Where feature selection is not an automatic part of the algorithm or the model considered, the feature selection module 403 performs feature selection in a way that optimizes or improves the goal of the task at hand while simultaneously minimizing or reducing the number of features being included in the model.

In some instances, the model estimation module 405 provides values for a set of model parameters that optimize or improve some criteria that are dependent on the task at hand. Model estimation by the model estimation module 405 is the process of calculating the numeric values or sets of rules for the given model type chosen, such that the task specific goal can be optimized or improved. The model estimation is performed by the model estimation module 405 within the MELP 400 and the results of model estimation (e.g., the model parameters or decision rules) can be the output 211 of the multi-task ensemble learning system 200 of FIG. 2.

In a subset of machine learning and statistical analysis known as supervised learning, the goal of analysis is learning a model that maps a set of inputs to a real valued output, where the process by which the model is learned depends on having observed historical associations between the set of inputs and the output. In online advertising, as well as in other fields, multiple types of output may be observed for the record derived from the same input. In some instances, the proxy learning module 407 performs a proxy learning process for using one type of output as a target variable for the ultimate prediction of a second and different quantity of interest. For example, one may learn a model using an indicator variable signaling a visit to a particular website and then use that same model as a proxy ranking for the likelihood of users to purchase from that same website. Proxy learning is performed by the proxy learning module 407 within the MELP 400 automatically by learning models on the available set of proxy outcomes and empirically determining which model is the best model for optimizing the goals of the task at hand.

The output 411 of the MELP 400 is the combined product of model selection module 401, the feature selection module 403, the model estimation module 405, and the proxy learning module 407. The general format of the output 411 depends on the results of the internal optimization within MELP 400, where the output 411 incorporates the structure of the model type selection by the model selection module 401 as well as the feature set selected by the feature selection module 403. The output 411 can be exported to other processes outside of the multi-task ensemble learning system 200 that may be used to make predictions that relate to the task at hand.

Figure 5:
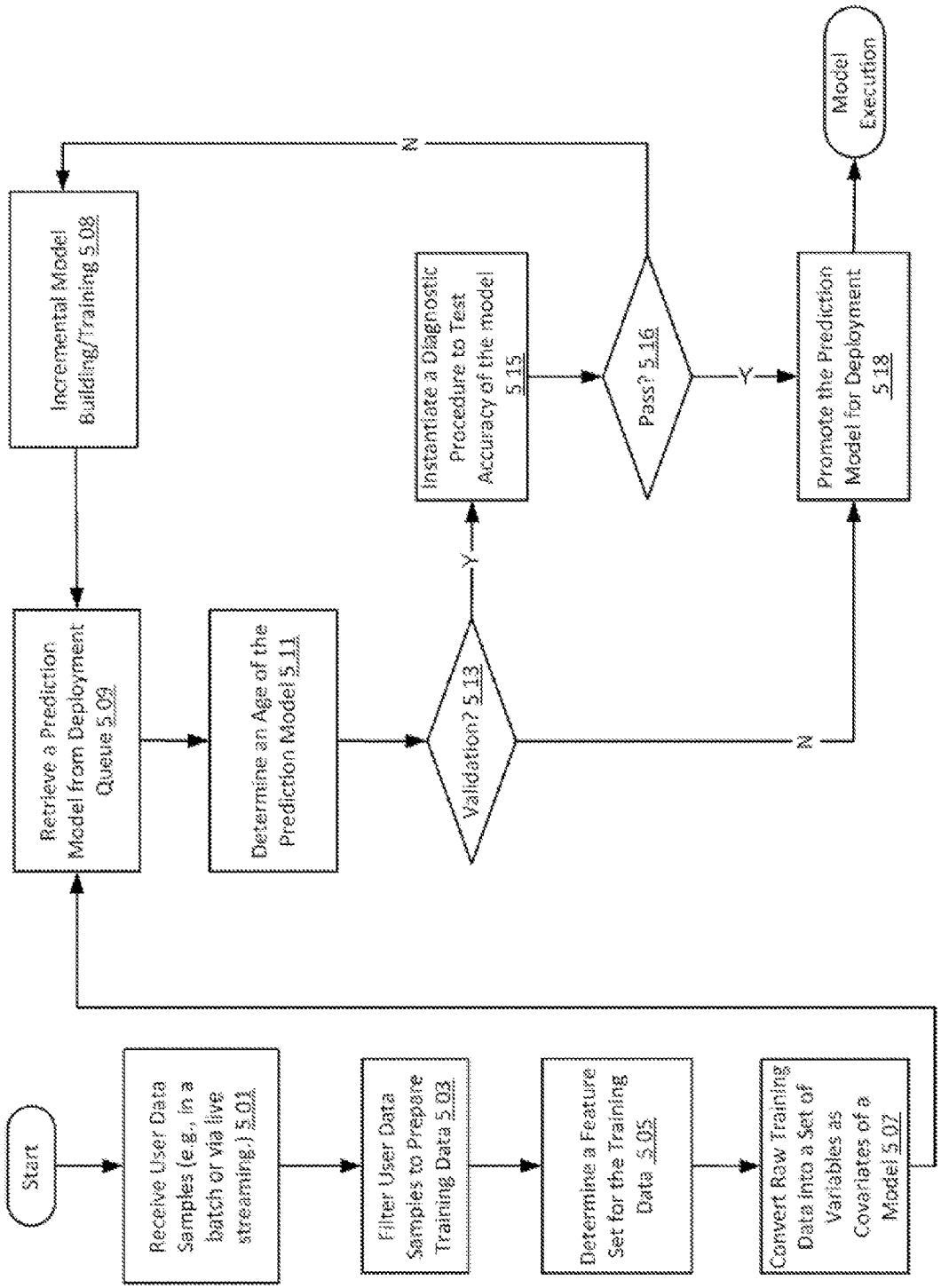
FIG. 5 is a logic flow diagram illustrating aspects of prediction model building and deployment, according to an embodiment.

FIG. 5 provides an exemplary logic flow diagram illustrating prediction model validation and deployment within an embodiment. In one implementation, as discussed in 117 in FIG. 1, the USS 117 may receive user data samples (e.g., in a batch or via live streaming) at 501, and then filter the user data samples to prepare training data at 503. For example, the data sampler may instantiate a streaming data sampling process, which includes data quality and eligibility checks that the accuracy and appropriateness of user data samples is improved for model building. For instance, by looking at the user's full list of timestamped actions, the data sampler may filter or store the user data samples as a positive only when they have been "dark" (e.g., inactive, etc.) on that action for a period of time. This prevents features on hyperactive users from being over-weighed in the models. The sampling and filter process at 501-503 permits the USS 117 to operate at scale. Training data may be sampled in a way that the training data does not need to be sorted or uniquely examined or processed so that training data may be pulled at high speed and/or in large volume.

In another example, the data sampler may collect a baseline sample such that a random sample may be collected once for all models into actual negatives for each model. Each sample may be stored once, but with its full action history of for which model that sample is a positive. As such, when the data sample may need to be pulled as negatives for a particular model, the data sampler may retrieve and examine data from this baseline sample, and determine if the user has taken the desired action in the last pre-defined X amount of time. If such user action is observed with the past pre-defined amount of time, the data sample may not be pulled as a negative. In this way only true negatives are pulled from the random samples. Alternatively, data training of user data samples may further locate a matched sample by specific time buckets. So each time a positive is identified, the USS 117 may pull as many negatives as desired that were collected at the same small time chunk.

In one implementation, as shown in FIG. 1, the FES 119 may determine a feature set to prepare the training data at 505. For example, the FES 119 may instantiate a feature mapper, and a given user can be categorized into different feature spaces when that user is observed. Multiple sets of features can be stored into the training data store for one training sample. For instance, an event comprising a user "clicking" on a new site URL that contains an advertisement display of a brand name product, may be categorized into features such as host site click-through, product brand name, new site name, and/or the like.

In one implementation, the FES 119 may convert raw training data into a set of variables as covariates of a prediction model at 507. For example, each feature mapper performs a method for turning raw log data into a set of variables or features that will be used as covariates of a statistical model. When a new user event (e.g., a user click-through, a user purchase transaction, etc.) is streamed through the USS 117, each feature mapper can be invoked on the instance and this produces a record of each feature set on the user. Each feature set can then be used to train a separate model on the same user.

In one implementation, when a model is built (e.g., see further details in FIG. 6), the prediction model may be queued up for deployment at 509. In one implementation, a validation step may be adopted preventing a model from being deployed unless the model passes validation, and subsequent model training (e.g., see 508, etc.) would use the last known good model as a starting point. For example, the MELP 107 may determine an age of the prediction model at 511, e.g., the latest time that the prediction model was trained, and determine whether validation is to be executed at 513, e.g., when the model hasn't been trained or updated for a defined amount of time, the MELP 107 can optionally validate the model with updated data sets.

In one implementation, the MELP 107 may instantiate diagnostic procedure to test the accuracy of the model at 515, e.g., by evaluating distribution of model errors, homoscedasiciy, correlation of model errors, adequacy of existing explanatory variables, adding or dropping explanatory variables, and/or the like. When the prediction model passes the diagnostic procedure at 516, the MELP 107 may promote the prediction model for deployment at 518, e.g., to execute the prediction model to generate prediction outputs, etc. Otherwise, the prediction model may be provided to the model building/training module at 508, e.g., as further discussed in FIG. 6. In a further implementation, the MELP 107 may produce a single highly optimized model file with model parameters for all advertisement brands with which the MELP 107 is working. The MELP 107 may implement a ship-to-production process for these model files that does the following, e.g., once the model files reach the destination, product servers are commanded to switch to start reviewing the latest model files; checking and monitoring the age of these model files on which product servers operate; checking and monitoring which specific brands are not being built/have not been last built for a predefined period of time.

In a further implementation, the system may run a user scoring with a sampler process graph for model assessment.

Figure 6:
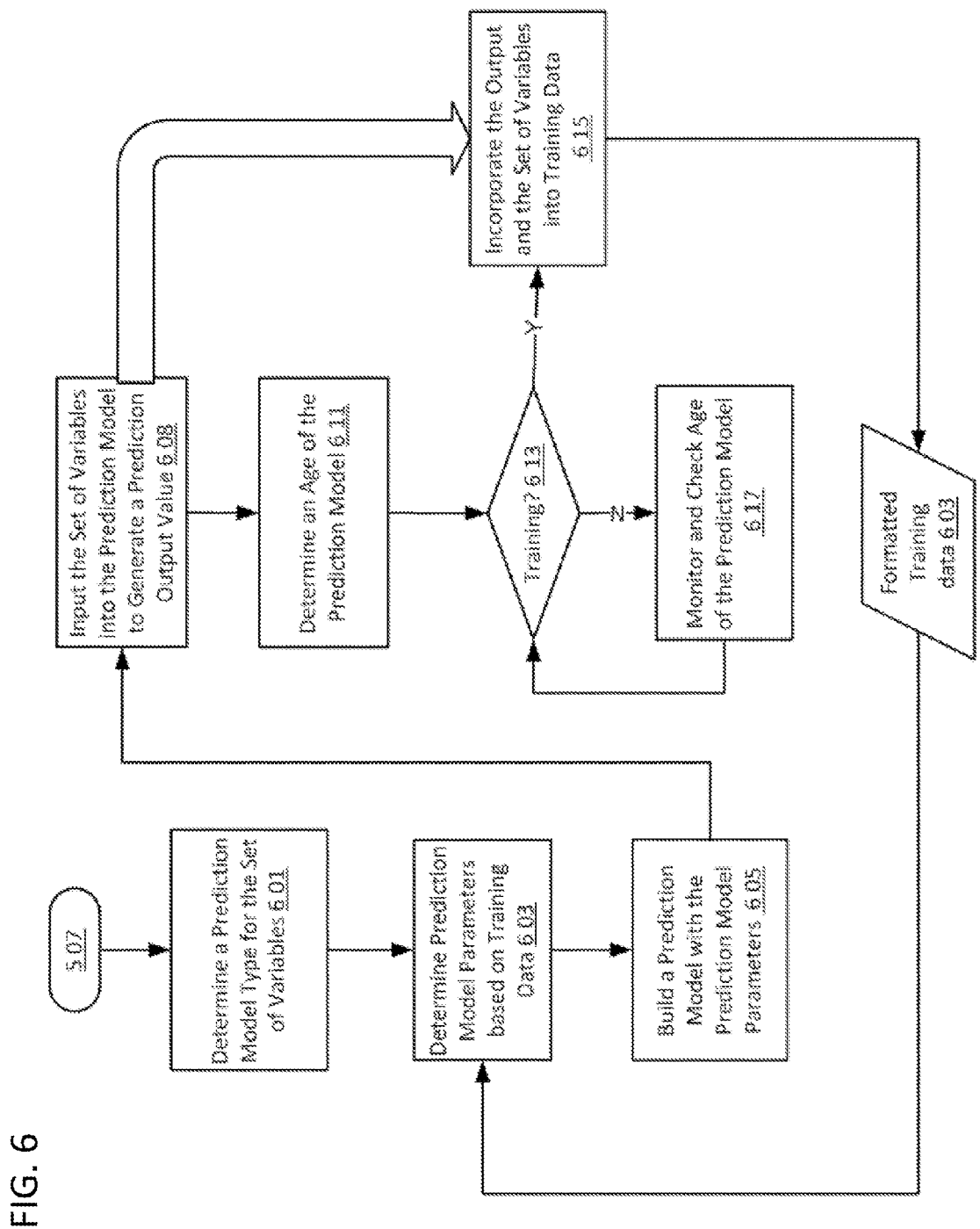
FIG. 6 is a logic flow diagram illustrating aspects of prediction model incremental building, according to an embodiment.

FIG. 6 provides an exemplary logic flow diagram illustrating incremental prediction model within one embodiment. In one implementation, continuing on with formatted training data at 507, the MELP 107 may incrementally build and/or train a prediction model with a bigger and bigger time window based on the age of the model. For example, the MELP 107 may initially retrain a prediction model frequently and the prediction model may be trained less often as the model matures.

In one implementation, the MELP 107 may determine a prediction model type for the set of variables of the training data at 601. For example, the MELP 107 may retrieve a prediction model based on the variable feature sets, e.g., per brand name (a model dedicated to predict ad performance of a brand name product), per user age group (a model used to predict target age group activities), per activity type (a mode dedicated to predict an action performance such as click-through, purchase transaction, etc), etc. In one implementation, the MELP 107 may determine prediction model parameters based on the training data at 603. For example, the MELP 107 may input training data representing prior data samples to regress the regression model parameters, and build the prediction model with the model parameters at 605.

In one implementation, the MELP 107 may input a set of variables as independent input into the prediction model to generate a prediction output value at 608. Such output value may be used as input to an incremental model building. For example, the output and the input of the set of variables may be incorporated into training data at 615, and converted to formatted training data at 603 (e.g., in the form of a vector), to train the prediction model, e.g., to re-determine the model parameters at 603.

In one implementation, the MELP 107 may determine an age of the prediction model at 611 to determine whether additional training at 613 is required or recommended. For example, the MELP 107 may train a model if it has not been trained or updated for a period of time (e.g., a predefined period of time). If so, the MELP 107 may continue to incremental training at 615. In one implementation, the MELP 107 may monitor and check the age of the prediction model at 617 constantly, intermittently and/or periodically to determine whether any re-training is needed.

It is intended that the systems and methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A processor-readable non-transitory medium storing processor-executable instructions, said instructions executable by a processor to:
   instantiate an automated data sampling and prediction structure training component,
   the automated data sampling and prediction structure training component being configured to automatically collect user event data samples, and use the collected user event data samples to simultaneously generate multiple training data sets to train a plurality of prediction structures in parallel;
   receive, via the automated data sampling and prediction structure training component, user event data samples indicative of a user activity performance characteristic;
   identify user event data associated with one or more target attributes from the user event data samples;
   convert the user event data into a set of independent variables in compliance with a data format;
   build the plurality of prediction structures, each prediction structure from the plurality of prediction structures (1) having the set of independent variables as inputs and (2) generating a prediction objective output during execution of that prediction structure;
   determine a prediction model parameter for a prediction structure from the plurality of prediction structures by instantiating that prediction structure; and execute, by the automated data sampling and prediction structure training component, the prediction structure associated with the prediction model parameter to produce a prediction objective value.

2. The medium of claim 1, wherein the user event data samples are received in a batch from a data storage system, and the batch is automatically processed for training the prediction structure from the plurality of prediction structures without exogenous interruption.

3. The medium of claim 1, wherein the user event data samples are received via live streaming in response to a user event, and the live streaming is automatically processed for training the prediction structure from the plurality of prediction structures without exogenous interruption.

4. The medium of claim 1, wherein the one or more target attributes include at least one of user age, advertisement brand name, or user browser type.

5. The medium of claim 1, wherein the set of independent variables takes a form as a vector of numeric values.

6. The medium of claim 1, wherein the prediction structure from the plurality of prediction structures includes a regression model.

7. The medium of claim 1, wherein the prediction objective value includes a probability of an event occurring.

8. The medium of claim 1, wherein the processor-executable instructions to build the plurality of prediction structures includes processor-executable instructions to build, in parallel, a first prediction structure from the plurality of prediction structures and a second prediction structure from the plurality of prediction structures,
the first prediction structure (1) having the set of independent variables as inputs and (2) generating a first prediction objective output during execution of the first prediction structure,
the second prediction structure (1) having the set of independent variables as inputs and (2) generating a second prediction objective output during execution of the second prediction structure, the processor-executable instructions are further executable by the processor to:
determine (1) a first prediction model parameter for the first prediction structure by instantiating the first prediction structure and (2) a second prediction model parameter for the second prediction structure by instantiating the second prediction structure; and
execute, by the automated data sampling and prediction structure training component, (1) the first prediction structure associated with the first prediction model parameter to produce a first prediction objective value and (2) the second prediction structure associated with the second prediction model parameter to produce a second prediction objective value.

9. The medium of claim 1, wherein the instruction to build the plurality of prediction structures further includes an instruction to select the prediction structure associated with the prediction model parameter based at least in part on predefined rules relating to the one or more target attributes.

10. The medium of claim 1, wherein the user event data is identified as a subset of the user event data samples based at least in part on a type of the prediction structure associated with the prediction model parameter.

11. A processor-readable non-transitory medium storing processor-executable instructions, said instructions executable by a processor to:
instantiate an automated data sampling and prediction structure training component,
the automated data sampling and prediction structure training component being configured to automatically collect user event data samples, and use the collected user event data samples to simultaneously generate multiple training data sets to train a plurality of prediction structures in parallel;
receive, via the automated data sampling and prediction structure training component, user event data samples indicative of a user activity performance characteristic;
identify user event data associated with one or more target attributes from the user event data samples;
convert the user event data into a set of independent variables in compliance with a data format;
retrieve a prediction structure from the plurality of prediction structures that employs the set of independent variables as inputs and that generates a prediction objective output when that prediction structure is executed;
validate the prediction structure retrieved from the plurality of prediction structures with the set of independent variables when a validation metric triggers validation; and
deploy, without exogenous interruption, the prediction structure retrieved from the plurality of prediction structures upon validation.

12. The medium of claim 11, wherein the validation metric includes an age of the prediction structure retrieved from the plurality of prediction structures.

13. The medium of claim 12, wherein the age of the prediction structure retrieved from the plurality of prediction structures triggers validation when the age of that prediction structure exceeds a threshold.

14. The medium of claim 11, wherein the instructions are further executable by a processor to:
instantiate a diagnostic testing procedure to determine when the validation is triggered.

15. The medium of claim 14, wherein the instructions are further executable by a processor to:
promote the prediction structure retrieved from the plurality of prediction structures to a deployment system when that prediction structure passes the diagnostic testing procedure.

16. The medium of claim 11, wherein the processor-executable instructions are further executable by the processor to:
build the plurality of prediction structures in parallel, the plurality of prediction structures including a first prediction structure and a second prediction structure,
the first prediction structure (1) having the set of independent variables as inputs and (2) generating a first prediction objective output during execution of the first prediction structure,
the second prediction structure (1) having the set of independent variables as inputs and (2) generating a second prediction objective output during execution of the second prediction structure,
determine (1) a first prediction model parameter for the first prediction structure by instantiating the first prediction structure and (2) a second prediction model parameter for the second prediction structure by instantiating the second prediction structure; and
execute, by the automated data sampling and prediction structure training component, (1) the first prediction structure associated with the first prediction model parameter to produce a first prediction objective value and (2) the second prediction structure associated with the second prediction model parameter to produce a second prediction objective value.

17. A processor-readable non-transitory medium storing processor-executable instructions, said instructions executable by a processor to:
- instantiate an automated data sampling and prediction structure training component,
- the automated data sampling and prediction structure training component being configured to automatically collect user event data samples, and use the collected user event data samples to simultaneously generate multiple training data sets to train a plurality of prediction structures in parallel;
- retrieve a prediction structure from the plurality of prediction structures (1) having a vector of variables as inputs and (2) generating a prediction objective output during execution of the prediction structure;
- receive, via the automated data sampling and prediction structure training component, user event data samples related to the vector of variables;
- identify user event data associated with one or more target attributes from the user event data samples;
- convert the user event data into a set of independent variables in compliance with a format of the vector of variables;
- execute the prediction structure retrieved from the plurality of prediction structures based on the set of independent variables to produce a prediction objective value;
- storing the prediction objective value with the user event data to produce updated user event data;
- incrementally update the prediction structure retrieved from the plurality of prediction structures with the updated user event data and the prediction objective value to produce an updated prediction structure; and
- deploy, by the automated data sampling and prediction structure training component, the updated prediction structure upon incrementally updating.

18. The medium of claim 17, wherein the instructions are further executable by the processor to monitor an age of the prediction structure retrieved from the plurality of prediction structures.

19. The medium of claim 18, wherein the prediction structure retrieved from the plurality of prediction structures is incrementally updated without exogenous interruption when the age of that prediction structure exceeds a threshold.

20. The medium of claim 17, wherein the prediction objective value is combined as an input to incrementally update the prediction structure retrieved from the plurality of prediction structures.

21. The medium of claim 17, wherein the instructions are further executable by the processor to instantiate a data loading interface component that includes a batch data loading component to support incrementally updating the prediction structure retrieved from the plurality of prediction structures without exogenous interruption.

22. The medium of claim 21, wherein the data loading interface component includes a data streaming component to support incrementally updating the prediction structure retrieved from the plurality of prediction structures without exogenous interruption.

23. The medium of claim 17, wherein the user event data samples are received from a real time scoring system.

24. The medium of claim 17, wherein the instructions are further executable by the processor to:
- instantiate data quality and eligibility check on the user data samples such that user data accuracy is improved.

25. The medium of claim 17, wherein the processor-executable instructions are further executable by the processor to:

build the plurality of prediction structures in parallel, the plurality of prediction structures including a first prediction structure and a second prediction structure,
- the first prediction structure (1) having the set of independent variables as inputs and (2) generating a first prediction objective output during execution of the first prediction structure,
- the second prediction structure (1) having the set of independent variables as inputs and (2) generating a second prediction objective output during execution of the second prediction structure,
- determine (1) a first prediction model parameter for the first prediction structure by instantiating the first prediction structure and (2) a second prediction model parameter for the second prediction structure by instantiating the second prediction structure; and
- execute, by the automated data sampling and prediction structure training component, (1) the first prediction structure associated with the first prediction model parameter to produce a first prediction objective value and (2) the second prediction structure associated with the second prediction model parameter to produce a second prediction objective value.

26. A system, comprising,
- a user data sampling component configured to receive user event data samples indicative of a user activity performance characteristic;
- a first feature engineering scheme module, disposed in communication with the user data sampling component, configured to:
  - identify first user event data associated with a first target attribute from the user event data samples, and
  - convert the first user event data into a first set of independent variables in compliance with a first data format;
- a second feature engineering scheme module, disposed in communication with the user data sampling component and in parallel to the first feature engineering scheme module, configured to:
  - identify second user event data associated with a second target attribute from the user event data samples, and
  - convert the second user event data into a first set of independent variables in compliance with a second data format;
- the first feature engineering scheme module and the second feature engineering scheme module being configured to process the user event data samples to generate respective set of independent variables simultaneously;
- a first prediction model builder, disposed in communication with the first feature engineering scheme module, configured to:
  - build a first prediction structure (1) having the first set of independent variables as inputs and (2) generating a first prediction objective output during execution of the first prediction structure,
  - determine a first prediction model parameter for the first prediction structure by instantiating the first prediction structure; and
  - execute the first prediction structure associated with the first prediction model parameter to produce a first prediction objective value; and
- a second prediction model builder, disposed in communication with the second feature engineering scheme module and in parallel to the first prediction model builder, configured to:
  - build a second prediction structure (1) having the second set of independent variables as inputs and (2) generating a second prediction objective output during execution of the second prediction structure, determine a second prediction model parameter for the second prediction structure by instantiating the second prediction structure, and execute the second prediction structure associated with the second prediction model parameter to produce a second prediction objective value;

the first prediction model builder and the second prediction model builder being configured to simultaneously build the first prediction structure and the second prediction structure, respectively.

* * * * *